Jan. 12, 1971　　　H. WEINSTEIN ET AL　　　3,553,853
TEACHING MACHINE
Filed Sept. 10, 1968　　　　　　　　　　　　3 Sheets-Sheet 3
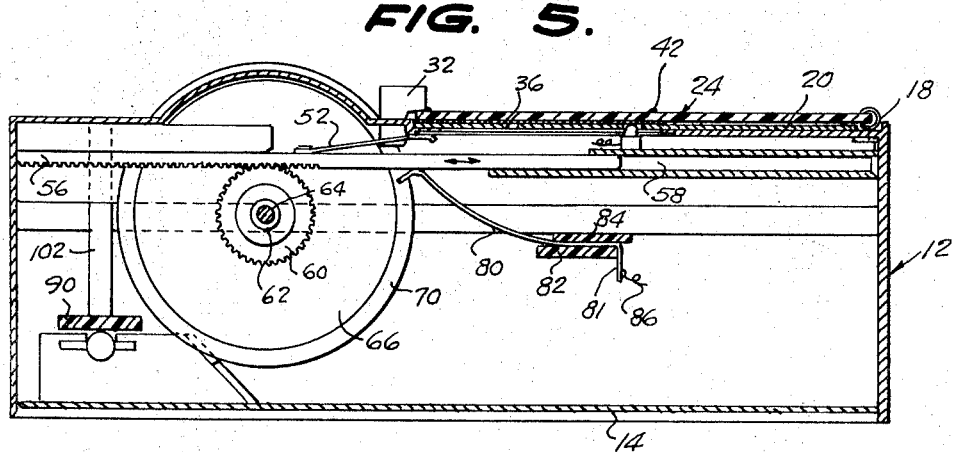
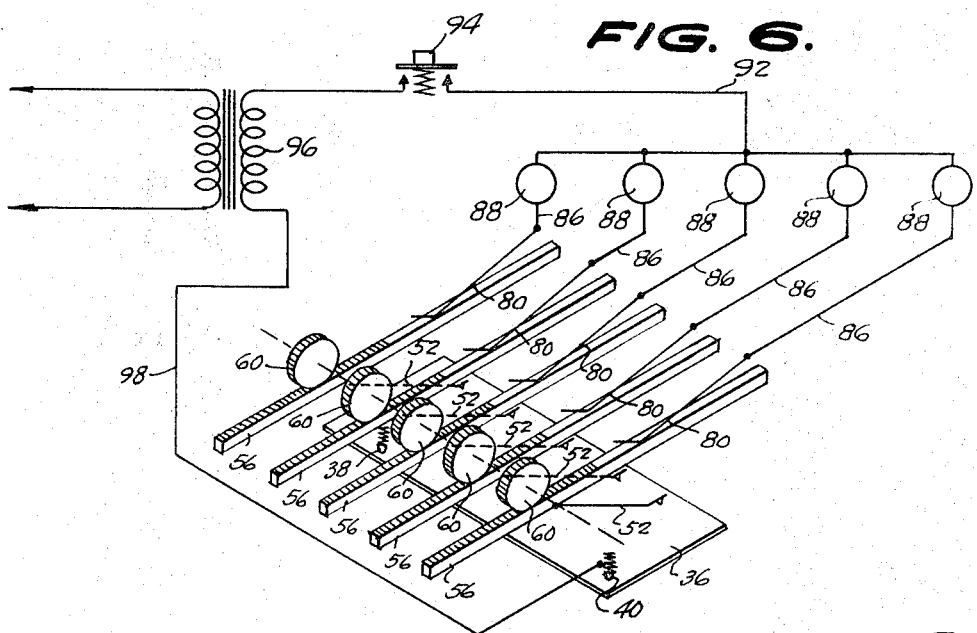
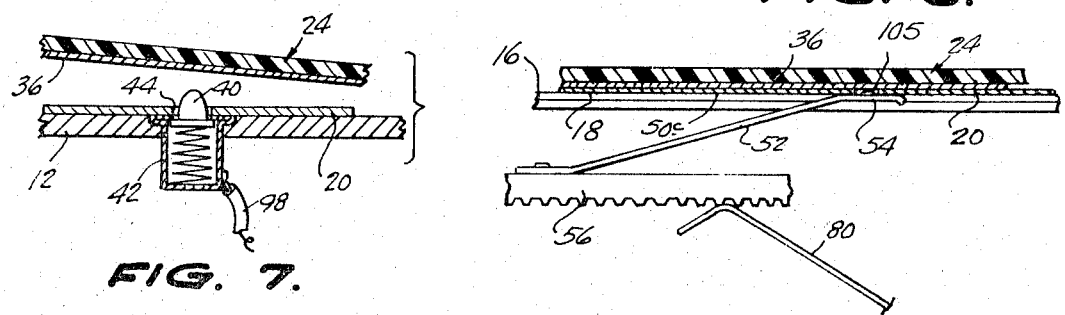
INVENTORS.
HAROLD WEINSTEIN,
EDWARD SNYDER, III.
BY
Drufsky and Staas.
ATTORNEYS

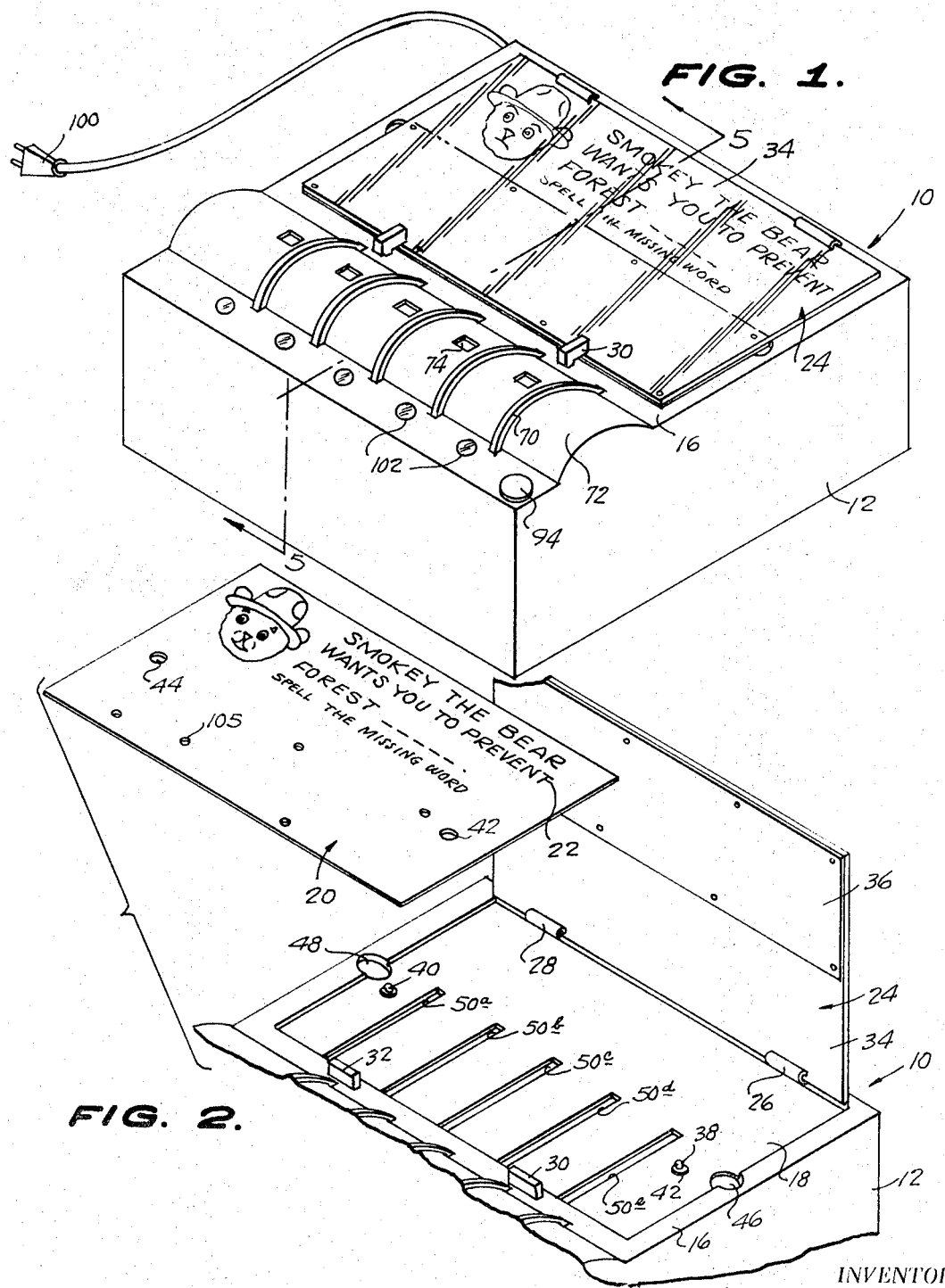

3,553,853
TEACHING MACHINE
Harold Weinstein, 1820 Ave. V 11229, and Edward Snyder III, 3323 Fillmore Ave. 11234, both of Brooklyn, N.Y.
Filed Sept. 10, 1968, Ser. No. 758,779
Int. Cl. G09b 7/02
U.S. Cl. 35—9                           11 Claims

ABSTRACT OF THE DISCLOSURE

A teaching machine for use with a programmed card containing a question to be answered or posing a problem to be solved. The card is inserted in the machine and the answer to the problem selected by rotating a plurality of indicia carrying wheels. Each wheel has a pinion fixed to it which meshes with a movable rack carrying an electrical contact element. If the answer selected is correct, the contacts will be in a predetermined relative position corresponding to the program on the card so that an electric circuit can be established through the card to indicate that the correct answer has been selected.

---

This invention relates generally to the field of educational apparatus and more particularly, to a portable machine for use as an aid in teaching children a variety of subjects such as language, history, geography, arithmetic, spelling, reasoning, reading coordination, and the like.

Briefly, the invention comprises a machine for receiving a programmed card containing a question to be answered or a problem to be solved. The card is inserted in the machine and the answer to the problem is selected by rotating a plurality of indicia carrying wheels, which when correctly positioned relative to each other will answer the problem posed. Each wheel has a pinion fixed to it which meshes with a movable rack carrying an electrical contact element. The position of the indicia associated with each wheel is indexed to correspond to a particular position of the rack. Therefore, when a student selects any set of indicia as his answer to the problem posed, each rack and its electrical contact will be positioned in predetermined relation with any other rack and contact combinations. The card is programmed so that if the selected indicia is correct, i.e., the electrical contacts are in a predetermined relative position, a plurality of electrical circuits will be established through the electrical contacts on the racks and the card by the depression of a switch. Visual indication of a correct answer can be established by the use of a lamp adjacent each wheel, connected in series to the electrical contact on the rack. Should any one of the selected indicia be improper, its lamp will not light. The student can then correct his answer by moving the particular wheel or wheels adjacent the unlit lamps until visual indication of the correct answer is obtained by actuation of any unlit lamps.

Accordingly, it is an object of this invention to provide a programmed teaching machine.

A further object of this invention is to provide a programmed teaching machine which enables the student to correct his own answers, thereby increasing its teaching effectiveness.

A still further object is to provide a programmed teaching machine which is simple in construction, positive in operation, and economical of manufacture.

Other objects and advantages of the invention will become apparent from the following description and claims and accompanying drawings wherein:

FIG. 1 is a perspective view of the teaching machine;

FIG. 2 is a partial, exploded perspective view of the teaching machine illustrated in FIG. 1;

FIG. 5 is a cross-sectional view taken substantially along the plane indicated by line 5—5 of FIG. 1;

FIG. 6 is a schematic diagram of the electric circuit employed in the teaching machine;

FIG. 7 is an enlarged fragmentary view of a portion of the teaching machine illustrated in FIG. 5; and FIG. 8 is an enlarged fragmentary view of another portion of the teaching machine illustrated in FIG. 5.

DETAILED DESCRIPTION OF THE INVENTION

Figure 3:
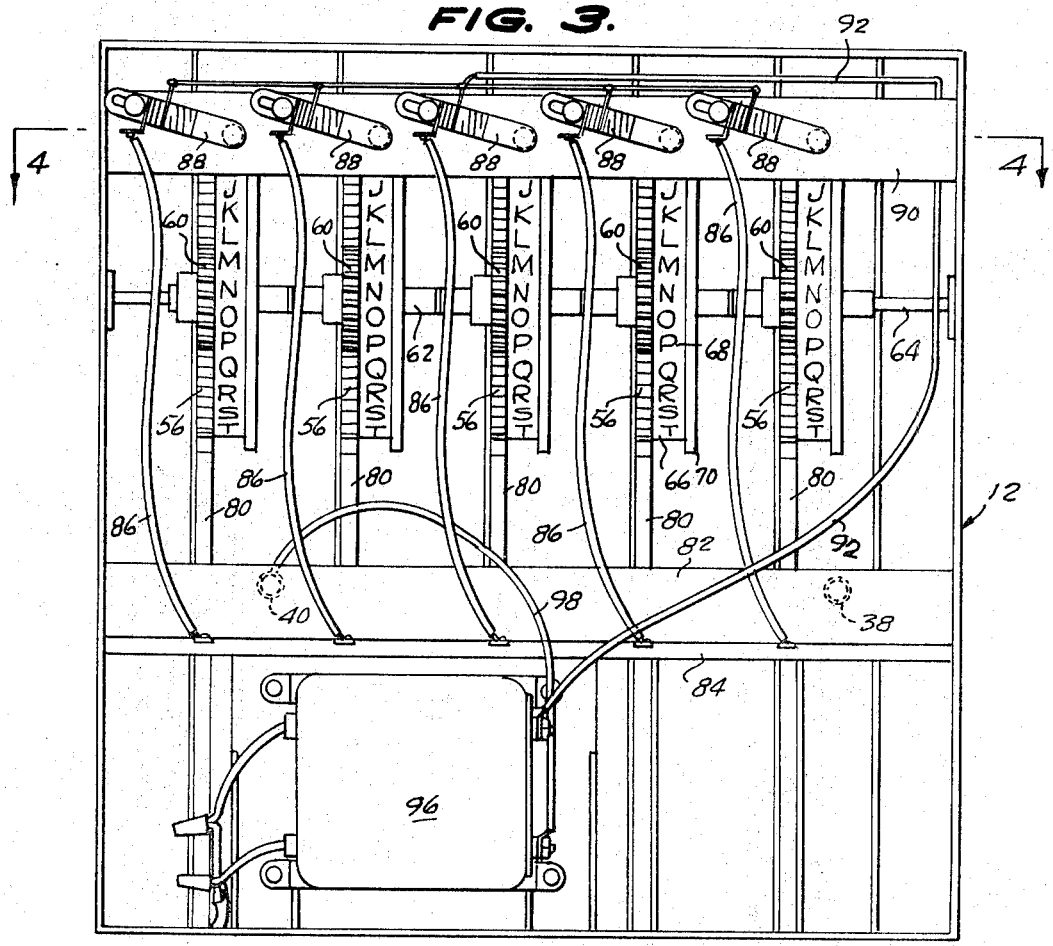
FIG. 3 is a bottom plan view of the teaching machine illustrated in FIG. 1 with the bottom cover panel removed.
Figure 4:
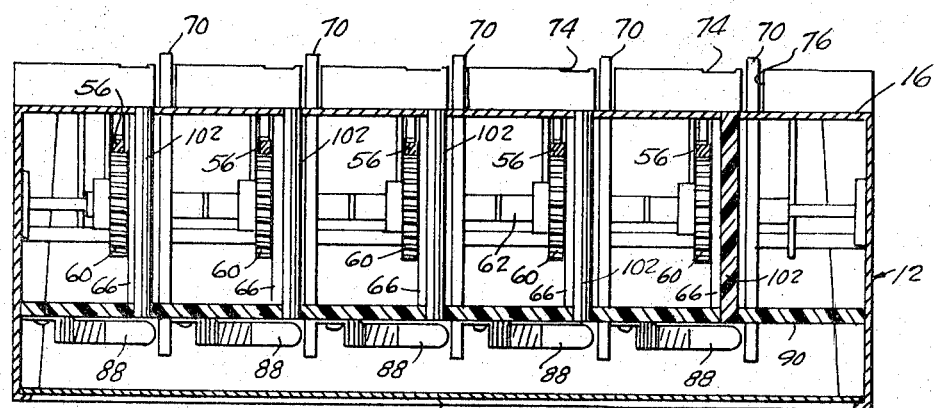
FIG. 4 is a cross-sectional view taken substantially along the plane indicated by line 4—4 of FIG. 3.

Referring now to the drawings in detail, wherein like numerals indicate like elements throughout the several views, the teaching machine comprising the present invention is generally indicated by the numeral 10.

Teaching machine 10 includes a plastic housing 12 provided with a removable bottom panel 14. Removal of bottom panel 14 permits access into the interior of housing 12 for repair or maintenance of the components of the machine 10.

Top surface 16 of housing 12 is provided with a generally rectangular recess 18 for receiving a programmed card 20 bearing indicia 22 posing a problem for solution by a student using the machine 10. After card 20 is positioned within recess 18, it is clamped in place by a cover element 24 hinged to top surface 16 by hinges 26, 28. Cover element 24 sits on card 20 and is fixed in position by pivotal clamping lugs 30, 32 which are turned to overlie the forward edge of cover element 24.

Cover element 24 includes a transparent portion 34 adapted to overlie indicia 22 on card 20 when element 24 is closed so indicia 22 can be read by the student. A metal conducting plate 36 is secured by suitable fasteners to the lower half of the bottom surface of cover element 24 and is adapted to engage a pair of spaced, spring-biased electrical contacts 38, 40, mounted in ferrules 42 supported on surface 16. Contacts 38, 40 also extend through holes 42, 44 adjacent opposite lateral edges of card 20 and serve to aid in aligning card 20 in recess 18. Finger recesses 46, 48 cut in opposite lateral edges of rectangular recess 18 permit the grasping and raising of cover element 24 when clamping lugs 30, 32 have been turned to the position indicated in FIG. 2. It also permits removal of card 20.

Formed in top surface 16, within the confines of recess 18 beneath metal conducting plate 36, are a plurality of parallel, longitudinal slots 50a, 50b, 50c, 50d, and 50e. Slidable within each slot 50a–50e is a spring metal electrical contact 52 (see FIGS. 5 and 8), having a conducting button 54 on one end. Each contact 52 is secured at its opposite end to a rack 56 fabricated from a good electrical conducting material. The rack 56 is supported in cantilever fashion within a longitudinal guideway 58 within housing 12.

Each rack 56 is in meshing engagement with a pinion 66. Pinions 60 are individually rotatable and are keyed or otherwise secured to a hollow stub shaft 62 rotatably mounted on a fixed shaft 64 supported between the side walls of housing 12.

Fixed to each stub shaft 62 adjacent its pinion 60 is a wheel 66, bearing indicia 68 about its circumference, and a finger wheel 70. Indicia wheels 66 are disposed beneath arcuate shaped portion 72 of top surface 16 of housing 12 and the individual indicia 68 on each wheel 66 can be viewed by the student through windows 74 cut in arcuate portion 72 above each wheel. Finger wheels 70 on the other hand, extend through slots 76 in arcuate portion 72 wherein they can be rotated by the student to cause rotation of any individual stub shaft 62 and thus any selected one of wheels 66 and pinions 60, which in turn will cause axial movement of a rack 56.

Each rack 56 is in sliding contact with one end of a spring metal electrical contact 80. Contacts 80 are supported at their other ends 81 between a pair of insulated bars 82, 84 fixed between the side walls of housing 12. Ends 81 are each connected by an electrical conductor 86 to a terminal of a lamp 88. Lamps 88 are mounted on an insulated bar 90 fixed between the side walls of housing 12. The other terminals of each lamp 88 are connected by an electrical contact 92 through a push-button switch 94, mounted on top surface 16 of housing 12, to one side of a transformer 96 or battery, mounted by suitable brackets within housing 12. The other side of transformer 96 is connected by an electrical conductor 98 to spring contact 38 or 40. Transformer 96 can be connected to a suitable A.C. power source by a conventional electrical plug 100.

Fixed between support bar 90 and top surface 16 of housing 12 directly above each lamp 88 is a light-transmitting "Lucite" rod 102. If a lamp 88 is lit, light will be transmitted by its associated rod 102 and will be visible on surface 16 of housing 12.

In operation, programmed card 20 is inserted in recess 18. Contacts 38, 40 are inserted through alignment holes 42, 44 in card 20, and cover element 24 is closed. Contacts 38, 40 will then be in electrical contact with metal conducting plate 36 fixed to cover element 24.

Card 20 has indicia 22 imprinted thereon, which indicia may pose a problem or seek an answer in a variety of subjects, such as language, history, geography, arithmetic, spelling, reasoning, reading coordination, and the like. For purposes of illustrattion in FIGS. 1 and 2, card 20 requires the student to spell the missing word and complete the statement "Smokey the bear wants you to prevent forest . . . ." This indicia is visible through the transparent portion of cover element 24.

After plug 100 has been connected to a suitable power source, the student will attempt to answer the problem posed by rotating finger wheels 70 to position the indicia 68 on each letter wheel 66 in windows 74 so that the combination of indicia spells the missing word. In the example posed, the answer "FIRES" is spelled by the student by rotating finger wheels 70 until the first letter wheel 66 is turned to locate the letter "F" in first window 74, the second letter wheel 66 is turned to locate the letter "I" in the second window 74, and so on.

Rotation of individual finger wheels 70 and letter wheels 66 will also cause simultaneous rotation of pinions 60 and consequent axial movement of racks 56 carrying electrical spring contacts 52. Cards 20 are programmed by forming holes 105 therethrough corresponding to the relative positions of contacts 52 when the word "FIRES" appears in windows 74. Each letter wheel 66 is indexed so that when a particular letter on a wheel 66 appears in a window 74, the rack 56 and electrical contact 52 associated with the letter wheel will be in a predetermined position beneath card 20. In this manner, card 20 can be punched with holes 105 at the location of contact button 54 on contact 52 to receive the button 54 and visually communicate to the student the correctness of his answer.

Assuming the student has correctly spelled the missing work "FIRES," the depression of switch 94 will cause light to be transmitted through each rod 102 indicating a correct answer. With particular reference to the schematic diagram in FIG. 6, an electric circuit will be established to each lamp 88 through switch 94, from transformer 96, electrical conductor 98, contact 40, plate 36, contact 52, rack 56, sliding contact 80, and conductor 86 through each lamp 88 and back to the opposite terminal of switch 94 through electrical conductor 92. Should the word "FIRES" be misspelled, the rod 102 adjacent window 74 of the misspelled letter will not transmit any light, since the button 54 on the associated electrical contact 52 will not be able to contact plate 36 because of the interposition of card 20 absent a programmed hole 105. The student will therefore have immediately conveyed to him where his error lies and by depression of switch 94 and rotation of the finger wheel 70 associated with the incorrectly positioned letter wheel 66, he can learn the correct spelling which will be indicated by transmission of light by the previously unlit lamp 88. The machine 10 therefore enables the student to correct his own answers, thereby increasing its teaching effectiveness.

Various equivalents and modifications of the structure illustrated are also contemplated as being within the scope of our invention. For example, in lieu of program card 20 with holes 105, electrically conductive material such as graphite or even foil inserts may be substituted at the hole locations. Of course, the machine may be used to answer questions by forming a word of less than five letters. Conversely, the machine may be built with more than five letter wheels.

In lieu of rack 56 and spring metal contacts 52 and 80, a one-piece rack having a molded spring contact holder on one end, with a spring urged contact disposed therein electrically connected directly to a lamp 88, can be provided. Furthermore, the overall depth of machine 10 could be reduced by using a pair of small diameter, spaced sprockets carrying an indicia bearing belt therebetween in lieu of letter wheels 66. Finger wheels 70 could still be used to rotate the sprockets, one of which could be mounted on stub shaft 62.

In order to eliminate the possible breakage of contacts 52, a plate or carriage could hold the racks, pinions, letter, and finger wheels. The carriage could be connected by a linkage arrangement to cover element 24 so that when cover element 24 is raised to position a card 20 in the machine, the carriage would descend moving the racks, pinions, and wheel downwardly. When the cover is closed, the carriage would ascend enabling the contacts to touch the card.

Alternatively, a card 20 can be inserted vertically, which would eliminate cover 24. The racks 56 would then have to move in a vertical direction.

Finally, the electric circuit elements could be eliminated by moving racks 56 flush with recess 18. Racks 56 could be painted white with a red dot located at the exact spot that contact points 54 would have been. An opaque plate in lieu of contact plate 36 is attached by hinges to the approximate lower half of the outer surface of door 24. The student will use the machine as described heretofore, except in order to determine the correctness of an answer, he will raise the opaque plate attached to door 24 and if the red dot appears at the location of holes 105 in the card 20, the answer is correct.

What is claimed is:
1. Teaching apparatus comprising
 a housing adapted to receive a card bearing indicia posing a problem to be solved by the user of said apparatus and a coded answer to said problem, said housing having a recess on one surface thereof to receive said card, a pivotal cover element secured to said surface and adapted to overlie said recess, said cover element having a transparent portion adapted to overlie the indicia on said card received within said recess whereby said indicia is visible to the user of the apparatus, said cover element further having an electrically conductive portion adapted to overlie the coded portion of said card, means defining a plurality of longitudinal slots in said recess,
 means within said housing for selecting an answer to the problem posed by the indicia on said card, said selection means including shaft means, a plurality of wheel means selectively rotatable on said shaft means, each of said wheel means having a portion extending through said housing for selective rotation thereof and an indicia-carrying portion, a pinion connected to each of said wheel means for rotation therewith, a rack in meshing engagement with each of said pinions, said housing having a plurality of spaced openings on one surface thereof, the indicia-carrying portion of each wheel means being exposed beneath a corresponding opening whereby selective rotation of said wheel means will render selected indicia of said wheel means visible through said corresponding openings as a composite answer to the problem on said card and cause said racks to move in response thereto, and means associated with each rack for testing the correctness of each of the individual indicia selected as an answer to the problem on said card by comparing the relative position of each rack to the coded answer on said card, said testing means including a plurality of normally open independent electric circuit means in said housing, each of said circuit means being actuatable when each of said racks is moved to a relative position corresponding to the coded answer on said card, said independent electric circuit means including electrical contact means on said racks disposed within said slots beneath said card and the electrical conducting portion of said cover element, and electrically conductive means in electrical series between the electrically conductive portion of said cover element and said electrical contact means on said racks through a common power source, whereby if the electrical contact means on said racks are moved to a position corresponding to the code on said card, an electric circuit can be completed from each of said contact means through said card to the conducting portion of said cover element.

2. Teaching apparatus in accordance with claim 1 wherein said electrically conductive means includes an electrical contact element within said housing in sliding engagement with each of said racks.

3. Teaching apparatus in accordance with claim 2 wherein said electrically conductive means includes a lamp in electrical series with each of said contact elements in sliding engagement with said racks, said lamps being adapted to indicate the correctness of the selected indicia on each of said wheel means upon closing said independent circuit means, and means for transmitting light from each of said lamps within said housing to the exterior thereof, said light transmitting means including a light transmission rod adjacent each lamp within said housing and extending through a surface thereof.

4. Teaching apparatus for use with coded cards, each card having an electrically insulating portion bearing indicia posing a problem, and bearing a coded answer to said problem in the form of means providing electrical access from preselected spaced-apart points on one face of said card to preselected spaced-apart points, respectively, on the other face of said card, said apparatus comprising:

a housing, a recess in said housing for individually receiving each of said coded cards, means for exposing said indicia on a card inserted in said recess, and for covering said electrical access means in the inserted card with an electrically conductive sheet, a plurality of members each bearing items of information in predetermined sequence, each of said members being movably fastened in said housing, a like plurality of windows in said housing associated respectively with said members for sequentially exposing items of information thereon as the respective member is moved through a sequence of positions, means for operating each of said movable members independently of the others to selectively position desired items of information in each of said windows, and means including respective electrical contacts movable with said movable members to make electrical connection with said conductive sheet through said inserted card via respective ones of said points of said electrical access means when the item of information exposed in a window corresponds to a respective part of the coded answer on the inserted card, for signifying a correct partial answer independently of the correctness of those parts of the selected answer represented by the items of information exposed in the remaining windows.

5. The invention according to claim 4, wherein said electrical access means comprises a plurality of spaced-apart holes in the card, each hole having openings on both faces of the card, corresponding to respective ones of said points.

6. The invention according to claim 4, wherein said electrical access means comprises a plurality of spaced-apart conductors in the card, each conductor having terminal portions exposed at both faces of the card, corresponding to respective ones of said points.

7. The invention according to claim 4, further including means mounted externally of said housing operable at will to verify the correctness of any part of the answer represented by an exposed item of information.

8. The invention according to claim 7, wherein said signifying means further includes means coupled to said verifying means for signaling the existence of a correct partial answer upon operation of said verifying means contemporaneously with the electrical connection of one of said contacts through the electrical access means of said inserted card to said conductive sheet.

9. The invention according to claim 8, wherein said signaling means comprises respective indicators sensible externally of said housing and associated with each window in which part of an answer can be represented.

10. The invention according to claim 9, wherein a completely correct answer is indicated by the actuation of all of said indicators in response to a composite of the items of information exposed in said windows effecting the making of electrical connection between said electrical contacts and said conductive sheet via the entire electrical access means of said inserted card, contemporaneously with the operation of said verifying means.

11. The invention according to claim 9, wherein each said indicator is a visual indicator disposed adjacent a corresponding window.

References Cited

UNITED STATES PATENTS

| | | | |
|---|---|---|---|
| 3,050,248 | 8/1962 | Lindquist | 35—48(.2)X |
| 3,146,534 | 9/1964 | Brown et al. | 35—35(.4) |
| 3,318,023 | 5/1967 | Myers | 35—35(.4) |

FOREIGN PATENTS

| | | |
|---|---|---|
| 641,771 | 8/1950 | Great Britain. |

WILLIAM H. GRIEB, Primary Examiner

U.S. Cl. X.R.

35—35